(12) United States Patent
Johnson

(10) Patent No.: US 7,245,034 B2
(45) Date of Patent: Jul. 17, 2007

(54) POWER SYSTEM FOR A TELECOMMUNICATIONS FACILITY

(75) Inventor: Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/287,774

(22) Filed: Nov. 28, 2005

(65) Prior Publication Data

US 2006/0076780 A1    Apr. 13, 2006

Related U.S. Application Data

(63) Continuation of application No. 10/896,535, filed on Jul. 22, 2004.

(51) Int. Cl.
F02B 63/04    (2006.01)

(52) U.S. Cl. ...................................... 290/1 A

(58) Field of Classification Search ............. None
See application file for complete search history.

(56) References Cited

U.S. PATENT DOCUMENTS

| | | | |
|---|---|---|---|
| 2,418,446 A * | 4/1947 | Anderson ................ | 62/50.2 |
| 2,958,482 A | 11/1960 | Summers | |
| 3,101,307 A * | 8/1963 | Barr et al. ............... | 376/325 |
| 3,336,162 A * | 8/1967 | Zachmann ................ | 429/8 |
| 3,375,675 A | 4/1968 | Christian et al. | |
| 3,732,690 A | 5/1973 | Meijer | |
| 3,967,465 A | 7/1976 | Asselman et al. | |
| 4,119,861 A | 10/1978 | Gocho | |
| 4,185,456 A * | 1/1980 | Cummings ............... | 60/780 |
| 4,283,634 A | 8/1981 | Yannone et al. | |
| 4,425,998 A | 1/1984 | Hof et al. | |
| 4,598,542 A | 7/1986 | Reynolds | |
| 4,736,111 A | 4/1988 | Linden | |
| 4,887,556 A | 12/1989 | Gladstone | |
| 5,305,714 A * | 4/1994 | Sekiguchi et al. ........ | 123/3 |
| 5,332,927 A * | 7/1994 | Paul et al. ............... | 307/66 |
| 5,375,580 A * | 12/1994 | Stolz et al. .............. | 123/527 |

(Continued)

FOREIGN PATENT DOCUMENTS

EP    0595191    5/1994

(Continued)

OTHER PUBLICATIONS

Yutaka, Kuwata, "Multifueld Fuel-Cell Energy System for Telecommunications Cogeneration System," Iece Trans Commun., vol. E1 B., No. 11, Nov. 1998.

(Continued)

*Primary Examiner*—Joseph Waks

(57) ABSTRACT

An energy generating system for a telecommunications facility includes a hydrogen fuel supply system. The hydrogen fuel supply system includes a source of liquid hydrogen which uses a high pressure expansion tank along with additional storage tanks. The system also incorporates first and second stage heat exchangers. The first stage exchanger is used to benefit from the endothermic reaction created when liquid hydrogen transforms into vapor. The cooling provided from this state change is transferred into a second medium which is delivered into a second stage heat transfer device and then used for air conditioning purposes. The system also includes a hydrogen generator which may be used to create AC power by combusting vaporous hydrogen.

4 Claims, 3 Drawing Sheets

U.S. PATENT DOCUMENTS

| | | | |
|---|---|---|---|
| 5,687,932 A | 11/1997 | Gomes | |
| 5,737,202 A | 4/1998 | Shimamori | |
| 5,760,488 A | 6/1998 | Sonntag | |
| 5,767,584 A | 6/1998 | Gore et al. | |
| 5,767,637 A | 6/1998 | Lansberry | |
| 5,929,538 A | 7/1999 | O'Sullivan et al. | |
| 5,959,851 A | 9/1999 | Shutts | |
| 6,011,324 A | 1/2000 | Kohlstruck et al. | |
| 6,153,943 A | 11/2000 | Mistr | |
| 6,184,593 B1 | 2/2001 | Jungreis | |
| 6,276,473 B1* | 8/2001 | Zur Megede | 180/65.2 |
| 6,304,006 B1 | 10/2001 | Jungreis | |
| 6,380,637 B1 | 4/2002 | Hsu et al. | |
| 6,389,841 B1 | 5/2002 | Feldman, Jr. et al. | |
| 6,428,919 B1* | 8/2002 | Takahashi et al. | 429/19 |
| 6,452,289 B1 | 9/2002 | Lansberry et al. | |
| 6,463,738 B1 | 10/2002 | Pinkerton et al. | |
| 6,492,047 B1* | 12/2002 | Peled et al. | 429/30 |
| 6,498,462 B2 | 12/2002 | Ballantine et al. | |
| 6,516,616 B2 | 2/2003 | Carver et al. | |
| 6,522,955 B1 | 2/2003 | Colborn | |
| 6,582,842 B1* | 6/2003 | King | 429/19 |
| 6,649,289 B2 | 11/2003 | Hsu et al. | |
| 6,666,123 B1 | 12/2003 | Adams et al. | |
| 6,703,722 B2 | 3/2004 | Christensen | |
| 6,746,790 B2* | 6/2004 | Colborn | 429/26 |
| 6,833,631 B2 | 12/2004 | Van Breems | |
| 6,841,893 B2 | 1/2005 | Maiwald et al. | |
| 6,879,052 B1 | 4/2005 | Johnson | |
| 6,885,112 B2 | 4/2005 | Johnson | |
| 6,907,735 B2* | 6/2005 | Wolff et al. | 60/605.1 |
| 6,930,402 B1 | 8/2005 | Johnson | |
| 6,960,838 B2 | 11/2005 | Johnson | |
| 6,992,401 B1 | 1/2006 | Johnson | |
| 2001/0009338 A1 | 7/2001 | Reutere | |
| 2002/0134544 A1 | 9/2002 | DeVilbiss et al. | |
| 2003/0077489 A1* | 4/2003 | Sahoda | 429/19 |
| 2003/0175564 A1* | 9/2003 | Mitlitsky et al. | 429/21 |
| 2004/0094963 A1 | 5/2004 | Johnson | |
| 2004/0095022 A1 | 5/2004 | Johnson | |
| 2005/0178432 A1* | 8/2005 | Porter et al. | 137/14 |
| 2006/0016189 A1 | 1/2006 | Johnson | |
| 2006/0038403 A1 | 2/2006 | Johnson | |
| 2006/0038533 A1 | 2/2006 | Johnson et al. | |
| 2006/0066108 A1 | 3/2006 | Willets et al. | |
| 2006/0071476 A1 | 4/2006 | Johnson | |
| 2006/0076831 A1 | 4/2006 | Meyers et al. | |

FOREIGN PATENT DOCUMENTS

| | | |
|---|---|---|
| WO | 9932762 | 7/1999 |
| WO | 2002087742 | 11/2002 |
| WO | 2004047206 | 6/2004 |
| WO | 2004047250 | 6/2004 |
| WO | 2004047262 | 6/2004 |
| WO | 2004105212 | 12/2004 |

OTHER PUBLICATIONS

Noboru Asano, "The Future of Our Fuel Cell Total Energy System," NTT Review, Mar. 1994, vol. 6, pp. 47-53.

"A High-Availability Backup Source of Energy", J.C. Chigolet et al., dated Sep. 27, 1993.

"Advances promise high cycle life, commerical viability for electric vehicles," Dept. of Energy, U.S.A., April (Imps).

Web page from www.activepower.com regarding TACAS Basic CleanSource XR: Thermal and Compresses-Air Storage, May 12, 2005.

Szary, Patrick J. and Dr. Ali Maher, "PEM Fuel Cell Integration With a Hydrogen Generator on a Bench," Final Report Jun. 2001, FHWA-NJ-2001-03, New Jersey Department of Transportation.

\* cited by examiner

US 7,245,034 B2

POWER SYSTEM FOR A TELECOMMUNICATIONS FACILITY

CROSS-REFERENCE TO RELATED APPLICATIONS

This application is a continuation of U.S. patent application Ser. No. 10/896,535 filed Jul. 22, 2004.

STATEMENT REGARDING FEDERALLY SPONSORED RESEARCH OR DEVELOPMENT

None.

FIELD OF THE INVENTION

In general, this invention provides a power system for a facility. More specifically, this invention provides a hydrogen-fueled backup system for immediate AC and DC power generation. The hydrogen fuel supply system, which converts liquid hydrogen to gas, is also used for cooling purposes in the facility.

BACKGROUND OF THE INVENTION

Digital electronic components make up a substantial part of the core technology of most modern telecommunications facilities. Under normal conditions, the operation of these digital components generates a significant amount of heat. In fact, if they are not cooled, the components will eventually overheat and fail. Thus, an operational air cooling system is critical to the continued optimal performance of the facility.

Air cooling systems require electrical power for their operation. Traditionally, telecommunications facilities rely on a commercial power utility as their primary source for electrical power. Thus, the power system for a facility will include a number of conventional devices, such as a transformer and switchgear, to receive and make available electrical power from a commercial utility. In addition, many facility's power systems include one or more backup power sources, along with the necessary components to monitor and deliver power from the backup sources, to insure the facility's power supply is not interrupted, such as in the case of a black-out or other disturbance in the commercial power system. Many facilities employ a diesel generator and an array of batteries as their backup power sources. Operationally, if power from the commercial utility is lost, the diesel generator supplies takes over to supply power to the facility, with the battery array providing power during the time it takes to switch from utility-supplied power to generator-supplied power. If the generator also fails (e.g., if the generator breaks down or runs out of fuel), then the battery array is able to provide power for an additional period of time.

There are several disadvantages inherent in the typical power systems for telecommunications facilities. For example, the cost of local electrical utility service has risen dramatically in recent years so that the cost of local electrical utility power is now a large component of a facility's overall power expenses. Moreover, the increased number of digital components has caused the facility's power demands to increase. In addition to being another factor that increases a facility's power expenses, the increased demand requires more batteries to provide an adequate amount of backup power for a reasonable period of time. Clearly, the component cost of the system increases when more batteries are required. Also, the greater number of batteries required has significantly increased the space required to house the system, which increases the spatial cost of the system. Finally, it is known that generators suffer from certain reliability problems, such as failing to start when needed because of disuse or failed maintenance, so that the overall effectiveness of the system is less than desired.

There is yet another disadvantage with the conventional systems that relates to the air cooling system. Many air cooling systems require a significant amount of electrical power for optimal operation. Unfortunately, current backup systems struggle to provide this amount of power in addition to satisfying the facility's power demands. This situation may cause the air cooling system to perform at a diminished capacity when power is being supplied by a backup power source. If the air cooling system does not perform at an optimal level, there is an increased risk that the facility's digital components will overheat and fail.

To overcome the disadvantages of the conventional systems, the present invention encompasses a power system that provides reliable electrical power that is not primarily dependent on a commercial electrical utility and that does not employ an array of batteries. The power system is more cost efficient and require less space that conventional systems. The power system employs redundant sources of power, and thus, is uninterruptible. The power system also includes components that provide efficient and effective air cooling when backup power is required. Although it may be utilized in numerous applications, this invention is specifically adapted to provided cooled air for a remote telecommunications facility.

SUMMARY OF THE INVENTION

The present invention encompasses a power system for a telecommunications facility. The system includes a number of microturbines components for receiving natural gas from a commercial gas utility company.

Along with the power-generation aspects of the present invention. An air conditioning system and method are also included. This system may be used for a telecommunications facility to provide a primary and/or backup air cooling system. The system includes first and second heat transfer systems. The first stage heat exchange includes a pipe coil surrounded by heat transfer tubing. Liquid hydrogen flows into the pipe coil where it absorbs heat from a second refrigerant flowing through the heat transfer tubing. Thereafter, the hydrogen gas flows out of the pipe coil where it may be utilized for various purposes, such as to provide fuel to a hydrogen generator. A hydrogen gas detector monitors the amount of hydrogen present in the atmosphere inside the first stage heat exchange. The detector is electronically coupled to a flow control valve in the liquid hydrogen line and operable to close the valve if the level of hydrogen in the housing atmosphere rises above a preset value. A number of heat supplies and air vents are also coupled to the housing. The heat and air flow provided by the heat supplies and the air vents cause any moisture that may form within the housing to evaporate or to flow from the housing.

The heat transfer tubing extends to the second heat exchange, which is generally conventional in nature. In the second heat exchange, the second refrigerant absorbs heat from, for example, air or water, which is used thereafter to cool the target space. In a preferred embodiment, the second stage heat exchange is coupled to the building or facility air conditioning system.

The invention also encompasses a system for providing electricity and air conditioning to a telecommunications facility in the event of a power loss. This system includes a first and second heat exchange as described above, a hydrogen generator, and a number of proton exchange membranes. Liquid hydrogen flows through the first stage heat exchange as described above and, having been heated to gaseous form, flows to a number of valves. The valves are coupled to at least one expansion tank, to a number of storage tanks containing hydrogen gas, or to the hydrogen generator. The hydrogen generator consumes the hydrogen gas it receives and produces electricity that may be utilized by essential systems within the telecommunications facility. The proton exchange membranes receive and consume hydrogen gas and produce electricity that may be utilized by the telecommunications facility. The second stage heat exchange provides cooled water or air that is thereafter used to cool at least the space housing the telecommunications equipment.

BRIEF DESCRIPTION OF THE DRAWING

The present invention is described in detail below with reference to the attached drawing Figures, wherein.

DETAILED DESCRIPTION OF THE INVENTION

Figure 1:
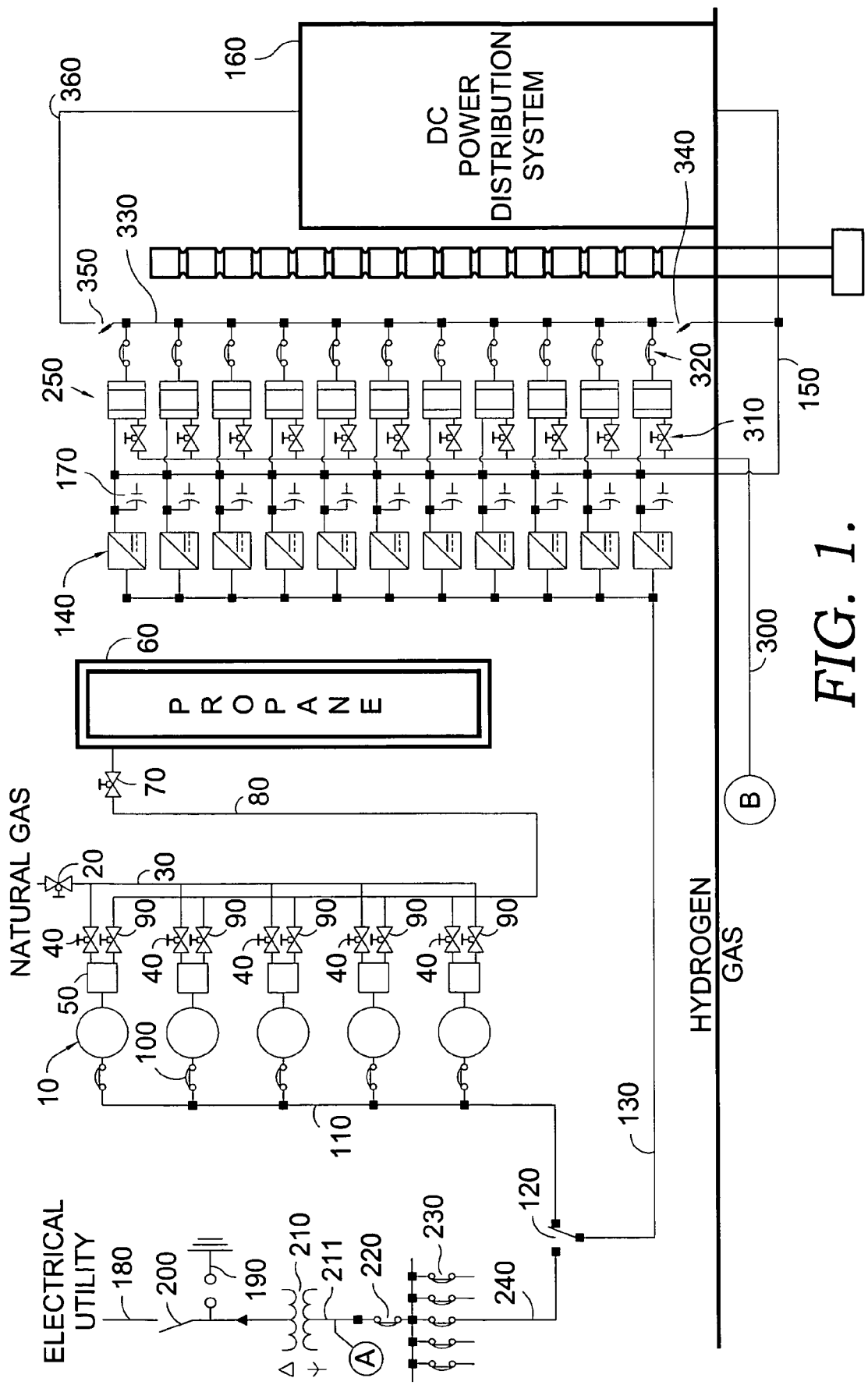
FIG. 1 is a schematic diagram of the energy management system of the present invention.

The present invention, in one embodiment, works along with a power system for a telecommunications facility. The novel power generation facility with which the present invention may be used employs liquid hydrogen as an energy source. In the embodied system, the hydrogen is used in two ways. It may be combusted, or it may be introduced into a battery of proton-exchange devices. For combustion, the system provides an internal combustion engine. This internal combustion engine is used to generate alternating current (AC) to satisfy the standard needs which are typical for all facilities, e.g., the heating, air conditioning, lighting, inter alia. The direct current (DC) generated by the introduction of hydrogen into the battery of proton exchange devices is used to meet the special DC power needs of the telecommunications facility, e.g., phone line support.

Before being used to generate energy for either method, the liquid hydrogen must first be converted to vapor. The vaporous hydrogen is then used to create power. When liquid hydrogen is transformed into a vapor, the state change causes an endothermic reaction. This means that heat is absorbed into the hydrogen from its surrounding environment.

The present invention takes advantage of this heat absorption, and uses it for air-conditioning the facility, or other cooling needs. In the disclosed embodiment, the hydrogen supply/air-conditioning system provides a backup air cooling system for a telecommunications facility. The reality, however, is that the present invention could be used in numerous applications not specified herein.

A general understanding of the nature of hydrogen is important in the discussion in order that the broad-reaching scope of the fundamental invention might be understood. Hydrogen gas is colorless and odorless. It is also highly flammable when it is mixed with oxygen. Upon mixture (usually accomplished by air exposure) what is called oxyhydrogen. Oxy-hydrogen is highly explosive—having the highest combustion energy release per unit of weight of any other matter.

Besides being highly combustible, hydrogen is also ecologically-sound. Its combustion produces only water. And because vaporous hydrogen is nontoxic to begin with, the overall process is non-polluting.

Hydrogen has an extremely low boiling point of −252.8° C. (−423° F.). Only helium is higher. Thus, in order to maintain it as a liquid, it must be contained in pressurized vessels.

Other fuels are maintained in this way. For example, liquid propane, liquid natural gas, inter alia, are oftentimes maintained in containers under pressure. Before combustion, these fuels are transformed from liquid to vapor—like hydrogen. Thus, the objectives accomplished here could likely be repeated for these, and other fuels not specified herein. Here, however, hydrogen is especially relevant because of its increased use for power generation purposes (electrical and mechanical power) in a broad array of forums (e.g., from its use in power plants, motor vehicles, etc.) The present invention is not intended to be limited, thus, to a particular fuel/refrigerant, unless otherwise specified in the claims.

And it is, of course possible that the process of the present invention could be used with another state-changing form of matter which is not a fuel. Though hydrogen fuel is used in these disclosures, the present would cover other processes unrelated to combustion. For example, liquid-to-gas transitions are required in noncombustive processes associated with refining, food processing, oxidation prevention, and others. The process of the present invention could be used in these forums as well. Any matter undergoing a liquid to vapor transformation would also fall within the scope of the present invention depending on the particular circumstances in which it is used. Thus, the present invention should not be considered as limited to a combustion process or to using a fuel medium, necessarily.

The refrigeration generation aspect of the present invention also would be useable in noncombustive hydrogen processes. Hydrogen is used for synthesizing polymers, solvents, ammonia, methanol, and hydrogen peroxide. It is also used to treat unsaturated fatty acids in food products. Hydrogen is also used in the manufacture of semiconducting layers in integrated circuits.

Additionally, it is used as a cooling medium because of its high thermal conductivity and low friction resistance. It is also sometimes used as a protective atmosphere for fabricating fuel rods for use in a nuclear power plants. Other examples exist. The present invention could be used in these noncombustive hydrogen applications as well.

The system of the present invention uses two heat transfer systems—first and second stage exchangers. The first stage heat exchanger includes a pipe coil surrounded by heat transfer tubing. Liquid hydrogen flows into the pipe coil where it absorbs heat from a second refrigerant flowing through the heat transfer tubing. Thereafter, the hydrogen gas flows out of the pipe coil where it may be utilized for various purposes, such as to provide fuel to a hydrogen generator. A hydrogen gas detector monitors the amount of hydrogen present in the atmosphere inside the first stage heat exchange. The detector is electronically coupled to a flow control valve in the liquid hydrogen line and operable to close the valve if the level of hydrogen in the housing atmosphere rises above a preset value. A number of heat supplies and air vents are also coupled to the housing. The heat and air flow provided by the heat supplies and the air vents cause any moisture that may form within the housing to evaporate or to flow from the housing.

The heat transfer tubing extends to the second heat exchange, which is generally conventional in nature. In the second heat exchange, the second refrigerant absorbs heat from, for example, air or water, which is used thereafter to cool the target space. In a preferred embodiment, the second stage heat exchange is coupled to the building or facility air conditioning system.

The invention also encompasses a system for providing electricity and air conditioning to a telecommunications facility in the event of a power loss. This system includes a first and second heat exchange as described above, a hydrogen generator, and a number of proton exchange membranes. Liquid hydrogen flows through the first stage heat exchange as described above and, having been heated to gaseous form, flows to a number of valves. The valves are coupled to at least one expansion tank, to a number of storage tanks containing hydrogen gas, or to the hydrogen generator. The hydrogen generator consumes the hydrogen gas it receives and produces electricity that may be utilized by essential systems within the telecommunications facility. The proton exchange membranes receive and consume hydrogen gas and produce electricity that may be utilized by the telecommunications facility. The second stage heat exchange provides cooled water or air that is thereafter used to cool at least the space housing the telecommunications equipment.

Figure 2:
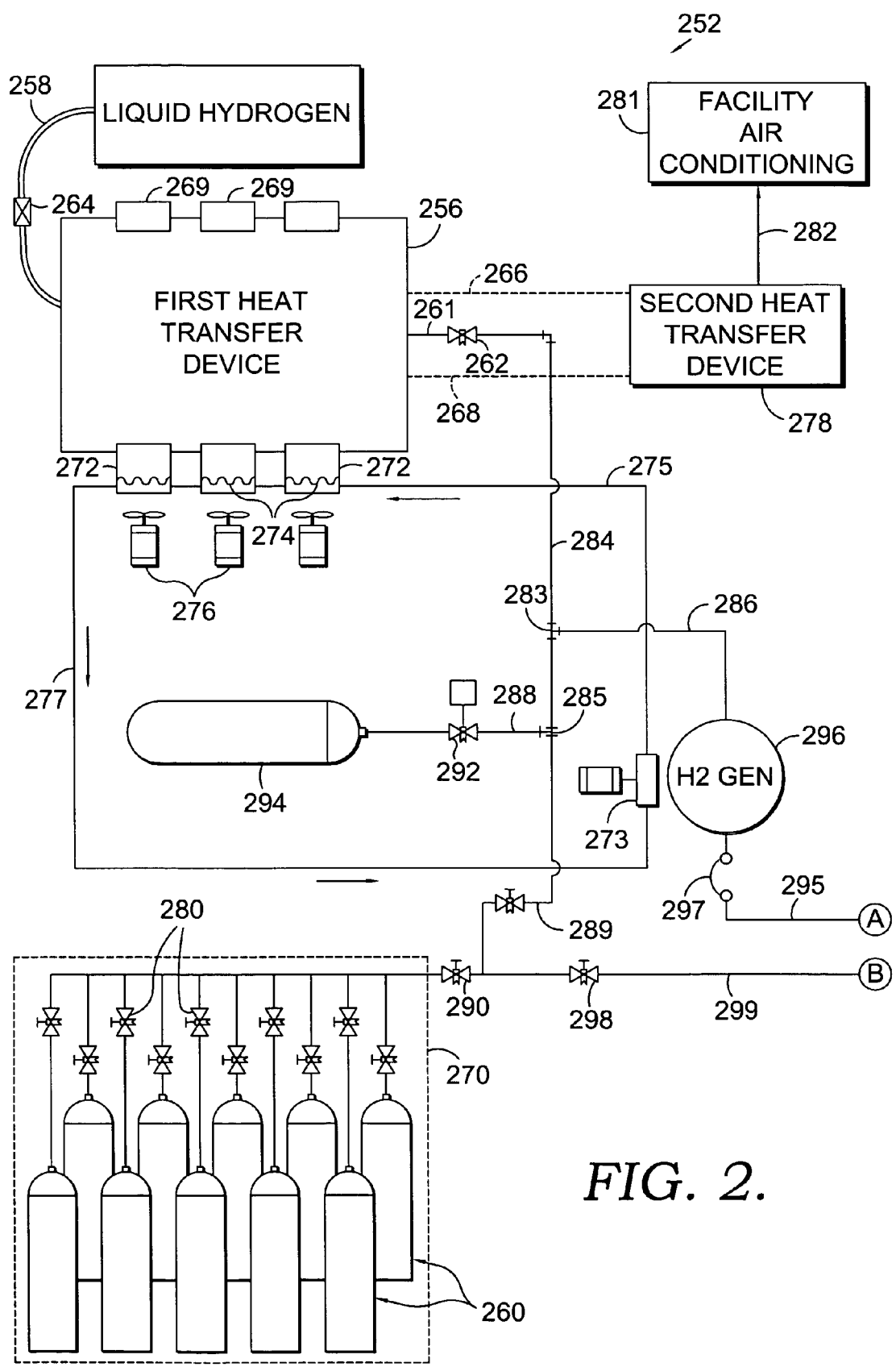
FIG. 2 is a schematic diagram of the hydrogen fuel management/air conditioning/energy generation system of the present invention.
Figure 3:
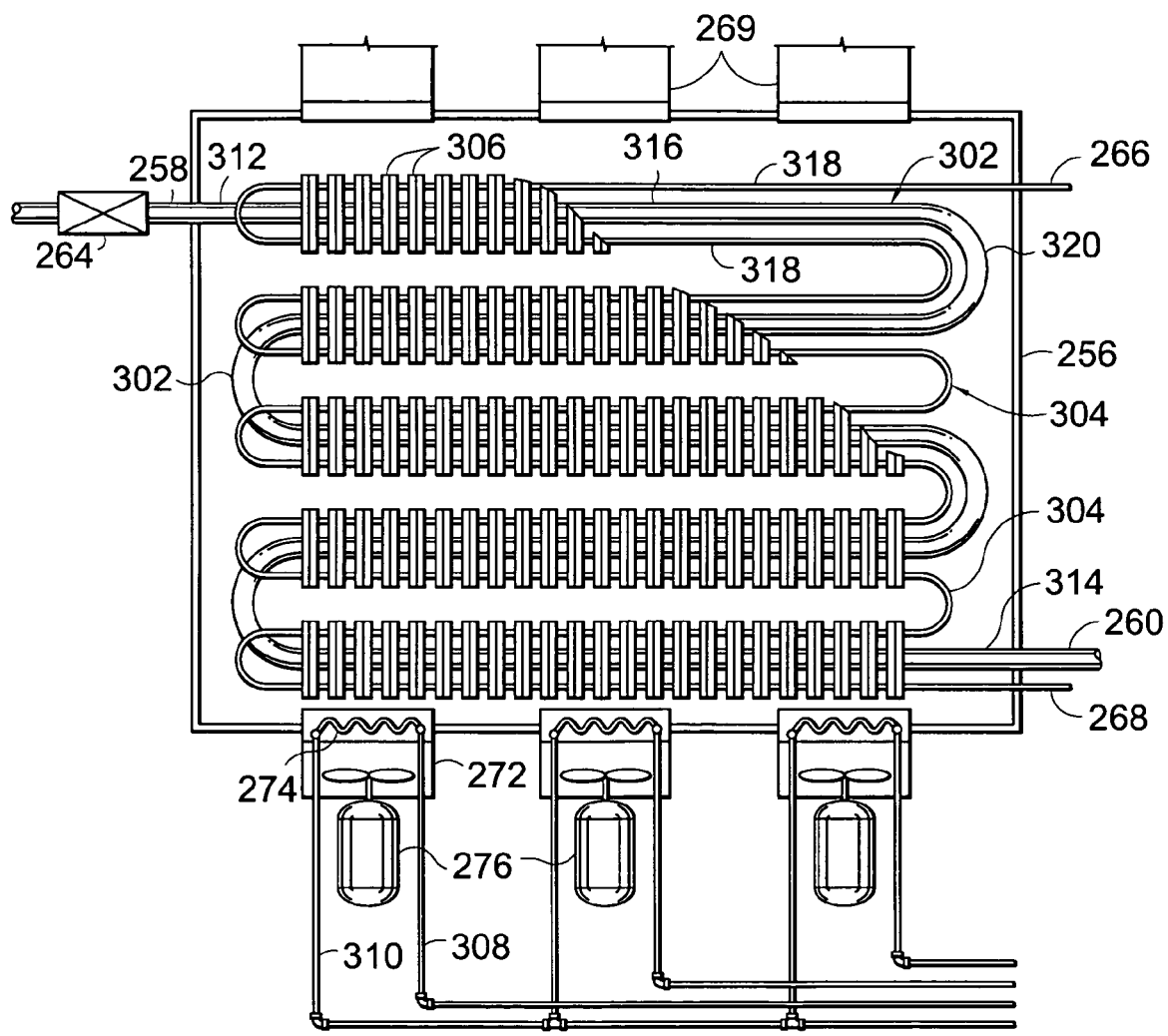
FIG. 3 is an illustration showing the details regarding the first stage heat transfer device of the present invention.

The present invention is best understood in connection with the schematic diagrams of FIG. 1-3. FIG. 1 shows a novel power system in which the present invention, in one embodiment, may be employed. This embodiment comprises a number of microturbine generators 10. Generally, a turbine includes a rotary engine actuated by the reaction or impulse or both of a current of fluid, such as air or steam, subject to pressure, and an electrical generator that utilizes the rotation of the engine to produce electrical power. A microturbine is smaller and more compact than more common turbines. This makes them much more space-friendly. Another benefit of these turbines is that they create fewer harmful emissions than both more common turbines and diesel generators. A microturbine generator includes a system for receiving fuel, a microturbine for converting the fuel received to electrical power, and a digital power controller. Thus, a microturbine generator is able to utilize a fuel source such as natural gas or propane to produce electrical power. One microturbine generator that is suitable for the present invention is the Capstone 60 MicroTurbine™ system produced by the Capstone Turbine Corporation of Chatsworth, Calif. As is understood by those in the art, the number of microturbine generators used in the system depends on the amount of power required by the destination facility.

The present invention is designed so that microturbine generators 10 may receive fuel from two different sources. Initially, microturbine generators 10 are fueled by natural gas from a commercial utility. Natural gas is received in valve 20, which is coupled to pipe or line 30. Pipe 30 is also coupled to a series of valves 40, and each of valves 40 is also coupled to a first input of a mixing box 50. The output of mixing boxes 50 is coupled to the input of one of the microturbine generators 10.

Microturbine generators 10 may also be powered by propane stored in a local storage tank 60. The propane is received through backup fuel valve 70, which is coupled to backup fuel pipe or line 80. Pipe 80 is also coupled to a series of valves 90, and each of valves 90 is coupled to a second input of mixing boxes 50. Mixing boxes 50 are operable to combine fuel received with an necessary additional components and thereafter provide appropriate amounts of fuel to microturbine generators 10. Mixing boxes 50 are capable of receiving and responding to a control signal by at least opening or closing lines. In addition, valves 20, 40, 70 and 90 are also capable of receiving and responding to a control signal by at least opening and closing.

The microturbine generators 10 produce AC electrical power. The output from each microturbine generator 10 is coupled to one end of a circuit breaker 100. The circuit breakers 100 protect the system if, for example, one of the microturbine generators 10 causes a power surge. The opposite end of each circuit breaker 100 is coupled to a bus line 110. That line is also coupled to one side of switch 120. Bus line 130 is coupled to the output of switch 120 and then to a number of rectifiers 140. As is known, a rectifier is capable of receiving an AC input and rectifying or converting that input to produce a DC output. Thus, rectifiers 140 convert the microturbine-produced AC power to DC power. The output of each of rectifiers 140 is coupled to bus line 150. Bus line 150 is connected to the power distribution unit 160 in the destination facility. Power distribution unit 160 contains connections into the telecommunications facility's power lines, and/or provides connections to the various telecommunications equipment. Power distribution unit 160 may also contain additional circuit breakers or other power switchgear or safety devices and/or circuits, including circuits to limit the voltage or current provided to the facility's power lines, and monitoring/measuring equipment. A number of super capacitors 170 are also connected to bus line 150.

The system of the present invention is also capable of receiving power from a commercial utility. Utility-supplied power is received on bus line 180, and a connection to ground is provided through line 190. Bus line 180 is connected to one side of switch 200, and the other side of switch 200 is coupled to the primary side of transformer 210. As is known, a transformer is capable of receiving an input signal on its primary side and producing a corresponding signal on its secondary side that is electronically isolated from the input signal. The secondary side of transformer 210 is coupled to one side of a main circuit breaker 220. The opposite side of main circuit breaker 220 is coupled to one side of a number of circuit breakers 230. The opposite side of one of the circuit breakers 230 is connected to bus line 240; the remaining circuit breakers 230 are available to provide electrical power for additional applications or systems. Bus line 240 is also connected to an input of switch 120.

The power system of the present invention also includes a number of proton exchange membrane fuel cell modules (PEMs) 250. A PEM is a device that is capable of converting dry gaseous hydrogen fuel and oxygen in a non-combustive electrochemical reaction to generate DC electrical power. Because the only by-products of this reaction are heat and water, a PEM is friendly to the environment and may be used indoors and in other locations where it is not possible to use a conventional internal combustion engine. In addition, unlike a battery, a PEM is capable of providing electrical power for as long as fuel is supplied to the unit. One PEM that is suitable for the present invention is the Nexa™ power module manufactured by Ballard Power Systems Inc. of Burnaby, British Columbia, Canada. As with microturbine generators 10, the number of PEMs 250 required is dependent on the amount of power required by the destination facility.

Hydrogen fuel is supplied to the PEMs 250 from a number of storage tanks 260 located in a vault 270. Each of the storage tanks 260 is coupled to a valve 280. Each of valves 280 is coupled to a valve 290, which is also coupled to a pipe 300. Thereafter, pipe 300 is coupled to a series of valves 310, and each of valves 310 is coupled to one of the PEMs 250. The output of the PEMs 250 is connected between bus line 150 and a circuit breaker 320. As stated above, super capacitors 170 and the power distribution unit 160 of the facility are also connected to bus line 150. The other side of circuit breakers 320 is connected to a bus line 330. There are two switches connected to bus line 330. Switch 340 is coupled to bus line 330 on one side and bus line 150 on the other side. Switch 350 is coupled to bus line 330 on one side and bus line 360 on the other side. Unlike bus line 150, bus line 360 is only connected to power distribution unit 160 of the facility.

The power system of the present invention also comprises a number of sensing and control mechanisms (not shown) for determining which fuel source to activate and which power source to engage. As is known, the sensing mechanisms may be separate devices or may be integral to the valves, bus lines, and/or devices being monitored. Likewise, the control mechanism may be a separate device, such as a programmable logic controller, or may be part of one of the components already described, such as the microturbine generators 10. It is also possible that the sensing and control mechanisms may be combined into a solitary mechanism that may be a stand-alone unit or may be combined with one of the components already described.

In operation, a sensing/control mechanisms (not shown) initially causes valves 40 and 90 to allow natural gas to flow from the utility source to the microturbine generators 10 and to prevent the flow of propane to microturbine generators. These sensing/control mechanisms also initiate operation of the microturbine generators. In addition, the sensing/control mechanisms cause valves 310 to prevent the flow of hydrogen to the PEMs 250 and causes the PEMs 250 to remain off. In this manner, microturbine generators 10 produce AC power using utility-supplied natural gas. The AC produced by the microturbine generators passes through switch 120 to rectifiers 140 where it is converted to DC. Thereafter, the DC from rectifiers 140 is provided to the telecommunications facility power distribution unit 160 and to super capacitors 170. As is well known, when they first receive DC, super capacitors 170 charge to the level of the DC power provided.

If the sensing/control mechanism determines that there is an interruption in the utility-supplied natural gas, then it will cause valves 40 and 90 to prevent the flow of natural gas and allow the flow of propane from tank 60 to microturbine generators. Switch 120 remains in the same position as before and valves 310 continue to prevent the flow of hydrogen to form a potential source 305 to PEMs 250. In this configuration, microturbine generators 10 continue to generate AC power but now their fuel is propane.

If the sensing/control mechanism determines that both fuel sources for microturbine generators 10 have failed or that there is some other disturbance in the microturbine-supplied power which causes that power to become inadequate, then sensing/control mechanism will cause valves 40 and 90 to closed, thus and deactivating microturbine generators 10. The sensing/control mechanism will set switch 120 so that rectifiers 140 receive AC power from the electric utility. In addition, the sensing/control mechanism will keep valves 310 closed and PEMs 250 deactivated.

If the sensing/control mechanism determines that the electric utility has failed or the power it supplies has become inadequate and the microturbine generators 10 remain deactivated, such as due to a lack of fuel or a malfunction, then the sensing/control mechanism will cause valves 400 to open, beginning the hydrogen-power process. This allows hydrogen to flow to PEMs 250 from source 305. Thereafter, the control mechanism will activate 250. In this manner the PEMs 250 provide DC power to the telecommunications facility and to super capacitors 170.

The FIG. 1 energy management system also includes a transition protection system that ensures the maintenance of power in the event that a user desires to change from one energy source to another (e.g., from AC power received from a utility to propane, natural gas, or hydrogen) in the event there is an outage, or if the user wants to switch sources for other reasons. This is done using a plurality of super capacitors 170. These capacitors provide electrical power during the time it takes for the control mechanism to switch from one power source to another. Thus, the super capacitors 170 must have a discharge time greater than the longest time required to switch between power sources. One super capacitor that is suitable for this invention is manufactured by Maxwell Technologies located in San Diego, Calif.

The hydrogen system of the present invention, shown in FIG. 2, serves multiple purposes in addition to supplying vaporous hydrogen to the PEMs 250 to produce DC. Besides enabling DC power generation, AC 307 can be produced by combustion in a hydrogen combustion powered generator 296. Hydrogen combustion powered generator 296 is used to deliver backup AC power to the facility. Also, a heat-exchange arrangement is used to take advantage of the heat energy drawn in by the process of transforming the hydrogen from liquid to vapor. The heat vacuum is used for cooling purposes in the facility.

The incorporation of the hydrogen systems of FIG. 2 into the energy-management systems disclosed in FIG. 1 is accomplished by matching up prong B in FIG. 2 with prong B in FIG. 1. This mating of the two figures completes the hydrogen supply loop therebetween. Prong A in each chart, as will be described hereinafter, is illustrative of an embodiment in which AC generated by the hydrogen combustor generator 296 is instituted into the FIG. 1 system.

FIG. 2 shows a hydrogen system 252 which comprises, initially, a liquid hydrogen source 254. Liquid hydrogen source 254 will, in the preferred embodiment, comprise a cryogenic tank of some kind. Most cryogenic tanks are comprised of alloy steels which are used for extreme low temperature applications. The hydrogen is pressurized by a process. The tanks are capable of maintaining the hydrogen at high pressures so that it remains in liquid form.

From this tank, or multiple tanks, either of which comprise source 254, the hydrogen is introduced into a first stage heat transfer device 256 by way of a liquid hydrogen introduction line 258. Line 258 contains a control valve 264 which limits or allows the introduction of hydrogen into device 256. Hydrogen is removed from the exchanger in a hydrogen out take pipe (or line) 261. Line 261 has an out valve 262 to allow or prevent flow of hydrogen from within the exchanger 256. Thus, the transmission of liquid hydrogen in and out of device 256 can be controlled by manipulating valves 264 and 261.

Device 256 also circulates a second fluid medium which is used as a refrigerant. The refrigerant comprises ethylene glycol and water. The percentages of ethylene glycol to water can be manipulated depending on the circumstances. This percentage determination will be within the scope of what is known to those skilled in the art of heat exchange, refrigeration, and/or air conditioning technologies. Numerous other refrigerants, however, could be used and still fall within the scope of the present invention.

This second fluid medium which is used for the purpose of air conditioning ultimately, is introduced into the first stage heat transfer device 256 by way of a fluid refrigerant introduction line 266. The refrigerant is then brought out of the device 256 using a fluid refrigerant out line 268.

The first stage device 256 includes an air temperature control system. This system maintains the air temperature inside device 256 so that frozen condensate does not form on its internal components (which will be discussed hereinafter and are shown in FIG. 3). The devices shown at the top of device 256 are a plurality of air out-take vents 269. The out-take vents 269 are necessary to release air. Air is introduced into the device 256 at a plurality of air intake vents 272 located at the bottom of device 256. Each of these air intake vents 272 include heating coils 274. A plurality of fans 276 are used to transmit air past the coils 274. The heated air is then blown into the in-take vents 272, through the insides of device 256, and then out the outtake vents 269. This stream of heated air is used to maintain the temperatures such that ice does not form on the internal components of device 256.

The ethylene glycol/water medium transferred through device 256 is delivered and returned to a second stage heat transfer device 278 using lines 268 and 266, respectively. Second stage device 278 is used to provide cooling for a facility air conditioning system 281. This forms a source of cooling 282 which is delivered to the facilities AC unit 281, and then used to remove heat from the air introduced into the facility.

It is important to note that, although the cooling provided by the liquid hydrogen to gaseous hydrogen transformation is used for air conditioning purposes here, the cooling ability offered by the ethylene glycol/water medium circulated through device 256 could be used for numerous other purposes. For example, the heat absorption created could be used to cool equipment in the facility. Devices might be cooled as well. Power generation facilities often contain internal combustion engines, e.g., piston-driven engine 296, or turbines 10. These devices are often cooled by the transmission of fluid flowing there-through. Thus, the medium transmitted from device 256 could be used for this kind of fluid cooling, rather than for facility air conditioning purposes. Thus, the system and methods of the present invention should not be limited to any specific cooling purpose.

As will be described in more detail hereinafter in our discussions regarding FIG. 3, device 256 transforms the state of the hydrogen from liquid to vapor. The vaporous hydrogen, once it leaves device 256 via out pipe 261, and then passes through valve 262, defines a vaporous hydrogen supply line 284. Supply line 284 is tapped into for a multiplicity of purposes. At a first line 286, the hydrogen is branched off to supply a hydrogen combustor generator 296 at a T-junction 283. The vaporous hydrogen at T-junction 283 not devoted for combustion in hydrogen combustor generator 296 will be passed on through line 284 and be used for powering the PEMs.

Immediately below T-junction 283 on line 286 is a check valve 287. Check valves, as will be known to those skilled in the art, are pipe valves that allow flow in only one direction. Here, valve 287 represents, in a sense, a point of no return for the vaporous hydrogen devoted to the PEMs. Because check valve 287 prevents the backflow of vaporous hydrogen, any vaporous hydrogen introduced to expansion tank 294 and/or the storage tanks 270 will not be allowed back up into the upstream systems. Valve 287 also maintains the pressures downstream in the tanks. The pressure in tanks 294 and 270 will not be diminished by a pressure drop in line 284 above valve 287 due to, e.g., lack of hydrogen supply. At a second line 288, vaporous hydrogen is branched off by way of a T-junction 285 to an expansion tank 294, where it can be held there for future use. At a third line 289, vaporous hydrogen is branched off from line 284 to be stored in vaporous hydrogen operating tanks 260 in a vault 270.

The vaporous hydrogen tapped out of the system using line 286, is delivered to hydrogen combustor generator 296. Hydrogen combustor generator 296, in the preferred embodiment, is an internal combustion engine associated with an induction device. More specifically, the internal combustion engine is a piston-driven V-10 specifically designed by Ford Motors, Inc. for the purpose of combusting vaporous hydrogen and using the power created to drive a rotating shaft. The rotating shaft is linked to the induction device to generate AC.

Other types of hydrogen combustors could be used instead. For example, turbines, rotors, and other types of IC engines could be used instead of the piston-driven internal combustion engine used here.

The output AC is transmitted for use on electric conduit 295. Electric conduit 295 has breaker 297 which is provided to protect against power surges.

In one embodiment, the AC in conduit 295 is used to meet all or part of the facilities AC power needs in a backup situation. To do this, the current is simply directed into the facilities house power circuit line 211 (See FIG. 1). It will be understood to one skilled in the art that the needs of the house power circuit would likely include facility lighting, heating, air conditioning, and numerous other typical AC requirements. As seen in FIG. 2, a prong "A" exists which is the point from which this AC power is delivered from the FIG. 2 hydrogen energy management system to the overall energy management system of FIG. 1. Referring to FIG. 1, prong "A" can be seen as the point in the overall energy management system that the backup AC from hydrogen combustor generator 296 is received.

In an alternative embodiment (not shown), however, the AC output from hydrogen combustor generator 296 could be used to create DC power and used for the facilities DC needs through DC power distribution unit 160. In such a case, the AC from line 295 (see FIG. 2) would be tapped into line 130 in FIG. 1. From there, the AC would be run through rectifier bank 140 for the purposes of creating alternative DC power for the facility.

Besides generating AC, hydrogen combustor generator 296 also cooperates thermodynamically with the frost-prevention air-heating system for the first stage heat transfer device 256. This is the system comprising vents 272 and 269, coils 274 and fans 276. The cooperation is made possible by employing the fluid cooling system for hydrogen combustor generator 296. Internal combustion engines like that used for hydrogen combustor generator 296 usually come with a fluid cooling system using a fluid medium. The fluid cooling system normally comprises an engine jacket circulation system and pump. Jacket pump 273 is this type of system. Here, however, the cooling medium circulated through the internal combustion engine of the hydrogen combustor generator 296 is used for an additional purpose.

This purpose is to provide the heat necessary for warming up coils 274, which will in turn be used to maintain the internal features of device 256 in iceless condition.

Physically, this is done by connecting a feed line 275 and a return line 277 to the jacket pump 273. The feed line 275 draws warm fluid from the engine jacket pump 273 serving hydrogen combustor generator 296. This fluid will likely be a refrigerant. In the preferred embodiment, an ethylene glycol and water solution could be used as the fluid medium, much like the fluid medium used for the fluid system serving the second stage heat transfer device 278 comprising lines 266 and 268. Here, however, the ratio of ethylene glycol to water may be greatly different, depending on the characteristics of the engine.

This fluid will be at its hottest when it leaves the engine jacket of the internal combustion engine associated with generator 296. From there, it is transmitted through feed line 275 to the coils 274. Because of its greatly-elevated temperature, it is sufficient for elevating the heating coils 274 to a temperature sufficient to prevent the collection of frozen condensate on the insides of device 256. This heat energy would otherwise be wastefully dissipated to its environs using a radiator or other cooling device. Here, however, it is opportunistically employed. Once the fluid has passed through coils 274, its temperature will be significantly reduced. It will then be returned to the internal combustion engine through return line 277. There, it will be reintroduced through the engine's jacket. Thus, recycled for cooling purposes.

With respect to the arrangement surrounding expansion tank 294, an electronically-controlled valve 292 exists. Electric valve 292 will normally be set up and supported with some sort of automated system in a manner which will be evident and familiar to one skilled in the art. It is also variable, in that it may be closed, opened a little, opened a lot, opened all the way, or at any setting in between for the purpose of providing automatic control over the introduction of hydrogen into the tank for storage, or the removal of hydrogen from the tank for use in the PEMs. In the expansion tank 294, the hydrogen is held under pressure after it has been received from source 254. It may later released by opening valve 292 when its use is required.

The hydrogen in tank 294 ensures the immediate availability of hydrogen to the PEM system. Thus, it should be able to maintain the vaporous hydrogen at very high pressures. In the preferred embodiment, a 5,000 PSI tank is used. This makes it capable to quickly deliver fuel under high pressure in the need of an emergency start up procedure.

In addition to expansion tank 294, further hydrogen storage means is provided by a plurality of operating hydrogen storage tanks 260. These ten tanks are used for hydrogen storage purposes and are used to operate the PEMs 250, when they are in use. Each of these tanks maintains the liquid hydrogen at lower pressures, e.g., 2000 psi, much lower than those maintained in expansion tank 294 (e.g., 5000 psi). Unlike expansion tank 294, the plurality of storage tanks 260 are used to deliver the normal operating vaporous hydrogen to the PEMs. Normal operating flow will not require the high pressures offered by the expansion tank 294, however, expansion tank 294, in addition to its start up helpfulness, also offers a pressure back up if needed for the storage tanks during normal operation. E.g., during tank switch out, or refilling.

The plurality of storage tanks 260 are contained in a vault 270. The flow of hydrogen to and from the tanks in the vault is controlled using a master vault valve 290. Additionally, each of the individual storage tanks in the plurality 260 has a valve 280 which controls the access of hydrogen in and out of that particular tank. A vaporous hydrogen supply line 299 is what is used to deliver hydrogen to the PEMs 250, and the flow of hydrogen through this line may be controlled using a PEMs supply valve 298.

Alternatively, it should be noted, it might also be possible to supply hydrogen through the use of some type of fuel processor. Fuel processors are to be used to obtain hydrogen from other fuels which are more commonly available. These systems use reformers. See, e.g., U.S. Pat. No. 6,110,615 issued to Bloomfield. Reformers obtain hydrogen from another fuel, such as natural gas, and possibly even propane. Employed in the FIG. 1 embodiment, the reformer would accept either natural gas through valve 20, or propane from source 60. The reformer would then derive vaporous hydrogen from either source (natural gas or propane), then use the extracted hydrogen to fuel the PEMs 250. Pure hydrogen has been used in the preferred embodiment, however.

The hydrogen fuel supply system disclosed in FIG. 2 may be linked to the power system disclosed in FIG. 1 by matching up the "B" prongs in each figure. The vaporous hydrogen introduced at "B" in FIG. 1 is used to power the PEMs. This, in general terms, completes the hydrogen circuitry from one figure to the next.

The final figure, FIG. 3, shows more specifics regarding the way in which first stage heat transfer device 256 is constructed internally. Once liquid hydrogen is received from source 254, it is introduced into device 256 (or not) using control valve 264 which is fixed to line 258. Inside device 256, liquid hydrogen introduction line 258 morphs into a snaking conduit 302. Snaking conduit 302 is used to contain the transitioning hydrogen. By transitioning, it is meant that the hydrogen is changing from liquid hydrogen into a desired vaporous product. Thus, at a beginning point 312 of conduit 302, the hydrogen will be almost all liquid. Ultimately, at an ending point 314 of the snaking conduit 302, the hydrogen will be almost all vapor. This transformation—from liquid to vapor—is highly endothermic. Thus, the process causes tremendous heat to be drawn into the hydrogen from its surroundings.

The present invention makes use of this heat absorption. First, snaking conduit 302 is configured such that it has a plurality of elongated runs 316. At the end of each run 316, conduit 302 comprises one of a plurality of U-turn portions which reverse its direction, back and forth.

The endothermic heat transfer into conduit 302 is taken advantage of. This is done by providing a second snaking conduit 304 which substantially pursues conduit 302. Second snaking conduit 304 is morphed out of fluid refrigerant introduction line 266. As you will recall, line 266 is the line which receives ethylene glycol from the second stage heat transfer device 278. Second snaking conduit 304 is made to be in close proximity to first snaking conduit 302 to take maximum advantage of the heat transfer available from the transitioning hydrogen within it. Thus, conduit 304 essentially chases the heat drop created in conduit 302 as the hydrogen converts from liquid at beginning point 312 to vapor at point 314.

The close proximity of second conduit 304 to conduit 302 is enabled by a particular configuration. In this configuration, conduit 304 comprises a plurality of paralleling portions 318 which exist immediately above and below each of the elongated portions 316 of conduit 302. Conduit 304, like conduit 302, also contains a plurality of U-shaped portions 328 which reverse it, back and forth. In relation to conduit 302, these U-shaped portions 328 of the second conduit 304 form: (i) confining loops 322, which begin above an elongated portion of conduit 302 and then reverse to return at a position below conduit 302; (ii) free loops 324, which loop back from the bottom of one elongated portion to the top of the elongated portion immediately below it; and (iii) inner loops 326 which conform to the inside of one of the U-shaped portions 320 of conduit 302.

The heat transfer between the first conduit 302 and second conduit 304 is further enhanced using a plurality of fins 306. These fins are radially disbursed about elongated portions 316 of snaking conduit 302. These radial fins 306 allow the paralleling elongated portions 318 of snake conduit 304 to connect with and pass through them.

The structural combination of snaking conduits 302 and 304 along with radial fins 306 creates great heat transfer between the fluid-transitioning hydrogen in conduit 302 and the ethylene glycol/water solution transmitted through conduit 304. Because of this, the temperature of ethylene glycol/water introduced in through fluid line 266 will be dramatically reduced before it exits through fluid-out line 268. The now extremely cold ethylene glycol/water may then be used for air-conditioning or other cooling purposes.

From fluid-out line 268, as can be seen in FIG. 2, the refrigerant will be delivered to second stage heat transfer device 278, and then transmitted by any known means 281 to the facility's air conditioning, or to some other useful place for cooling purposes.

Also more specifically evident in FIG. 3, is the way in which the conduits 302 and 304 as well as fins 306 are protected from frozen condensate. This figure shows in more detail the fans 276, in vents 272, heating coils 274 and outtake vents 269. From this figure it can be seen that the flow of air will be delivered from the bottom of the page up through device 256 and exhausted from vents 269. As it does this, the flow will be transverse to the elongated portions of conduits 302 and 304, 316 and 318, respectively. The flow will be parallel to the radial fins 306, which are also transverse to the elongated portions.

The amount of heat delivered by may be controlled using sensors located proximate conduits 302 and 304 in device 256. As will be evident to one skilled in the art, thermocouples and/or other devices could be used to sense the temperature in the device 256. Means could then be used to vary the heat delivered by the coils 274 (e.g., fan speed, controlling the speed of jacket pump 273, or other dissipation of the medium transmitted in line 275) to control the internal temperature of conduits 302 and 304 and fins 306 so that condensate does not form, and then freeze on them.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A power supply system for providing electrical power to a telecommunications facility, said facility containing telecommunications equipment, said system comprising:
   a fuel cell which is operable to produce electrical power for the purpose of operating said telecommunications equipment, said fuel cell adapted to be powered by hydrogen supplied from a source, said source including
   a first storage vessel for meeting immediate hydrogen needs; and
   a second storage vessel for meeting the normal operating needs;
   said first vessel maintaining hydrogen at higher pressures than said second vessel;
   a source of liquid hydrogen;
   a vaporizing system for converting said liquid hydrogen to vapor for delivery to at least one of said first and second vessels; and
   a heat transfer device which absorbs heat into at least one of liquid and vaporous hydrogen from a fluid heat transfer medium, said fluid heat transfer medium being useable for cooling purposes.

2. The system of claim 1, wherein said fuel cell includes a proton exchange membrane.

3. The system of claim 1, wherein said fluid heat transfer medium is a refrigerant.

4. The system of claim 1, wherein said heat transfer device includes a first heat transfer device and a second heat transfer device, said second heat transfer device supplying cooling for an air conditioning system of the telecommunications facility.

* * * * *